Dec. 10, 1935.  J. KRAMPS  2,023,889
INTERMITTENT PEDAL DRIVE
Filed June 20, 1934
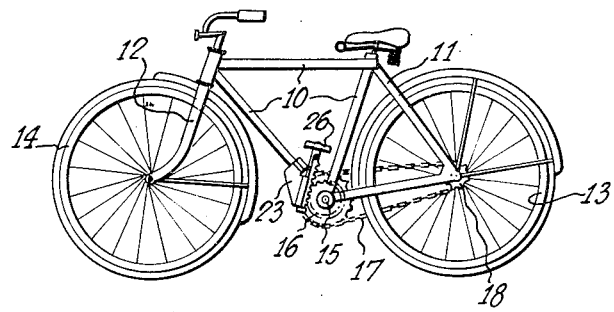
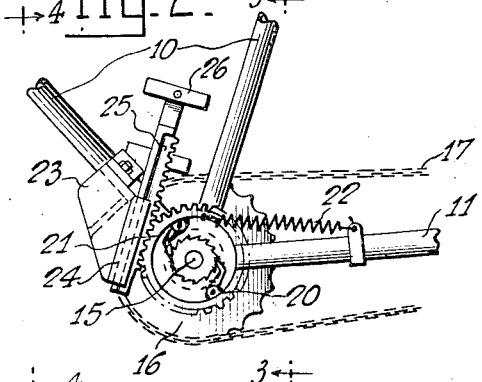
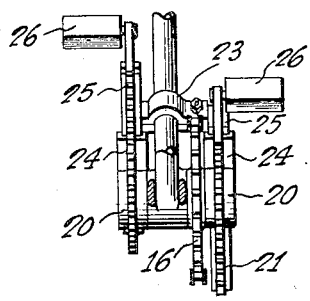
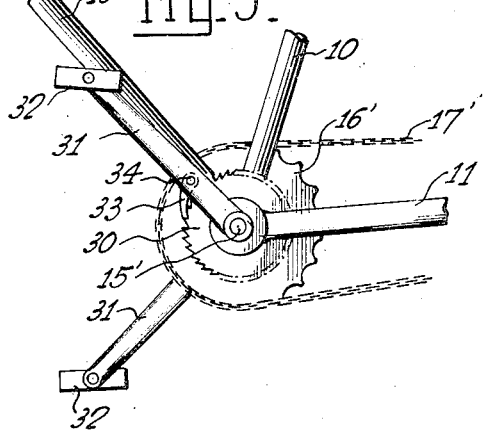
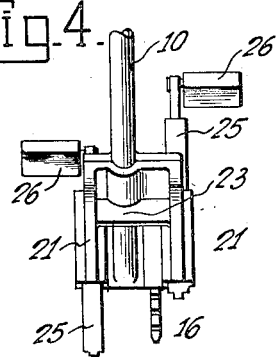
INVENTOR
Joseph Kramps.
BY
ATTORNEY Patented Dec. 10, 1935

2,023,889

UNITED STATES PATENT OFFICE 2,023,889

INTERMITTENT PEDAL DRIVE

Joseph Kramps, Hempstead, N. Y.

Application June 20, 1934, Serial No. 731,430

1 Claim. (Cl. 208—22)

This invention relates to pedally actuated propelling means for vehicles of the bicycle type and like devices.

An object of the invention is to provide an effective substitute for the common form of pedals that rotate around the axis of the drive spindle, causing the feet to assume an uncomfortable position, and which often catch parts of the operator's clothing to its damage and disfigurement.

A further feature is in the provision of a pair of pedals, mounted for straight line, reciprocative movement in an easy and graceful manner, with a moderate expenditure of energy.

Another purpose is to produce a drive device that requires a minimum of exertion only, as the length of the stroke, or downward movement of the pedal, depends entirely on the operator and is not controlled by advancement of the vehicle.

These advantageous objects are attained by the novel construction and combination of parts hereinafter described and shown in the accompanying drawing, forming part of this disclosure, and in which:—

Figure 1 is a side elevational view of a conventional type of bicycle showing the application of the invention.

Figure 2 is an enlarged side elevational view of the improvement.

Figure 3 is a sectional view taken on line 3—3 of Figure 2 looking in the direction of the arrows.

Figure 4 is a similar sectional view taken on line 4—4 of Figure 2.

Figure 5 is a side elevational view similar to Figure 2, but showing a modification in construction.

Figure 6 is a view of a conventional type of bracket drive.

As will be readily recognizable in Figure 1, the bicycle consists of the usual frame members 10, including the rear forks 11 and front forks 12 carrying respectively, the rear wheel 13 and steering wheel 14.

A spindle 15 is mounted at the junction of the lower members of the fork 11 and converging elements of the frame members 10.

On this spindle is fixed a sprocket 16 over which is trained a chain 17 leading to a smaller sprocket 18 on the rear axle along-side the drive wheel 13.

Mounted on the spindle 15, on opposite sides of the sprocket, are the elements 20 of a ratchet drive which, as will be understood, serves to actuate the spindle and hence the bicycle in a forward movement only, it running free in a reverse direction this device being well known and constituting no part of the invention in itself.

Fixed to this ratchet drive are toothed segments 21, normally drawn into the position shown in Figure 2 by a tension spring 22 attached to a convenient part of the rear frame element 11.

Secured to the front element of the frame 10 is a bracket 23 having laterally extending guides 24 in which are slidably engaged rack bars 25, the teeth of the racks being meshed with the teeth of the segments 21.

Pivotally engaged at the extreme upper ends of the rack bars are pedals 26 arranged conveniently of access to an operator on the saddle of the bicycle.

In operation it will be clearly apparent that upon depression of the foot pedals 26, the rack bar will be forced downwardly causing semi-rotation of the segment 21 and the ratchet drive; upon relaxation of pressure on the pedal, the springs 22 will return the pedals to their normal raised position ready for further operation.

In the modification shown in Figure 5, the same condition with respect to the frame are indicated including the sprocket 16', chain 17', and spindle 15'. In place of the segments, however, ratchet wheels 30 are secured to the spindle 15' on opposite sides of the chain sprocket 16' and fulcrumed on the outer end of the spindle 15' are a pair of angularly disposed levers 31 having at their free outer ends pedals 32 connected by pivots.

Pawls 33 are pivoted on the pins 34 set in the levers 31, these pawls being adapted to engage the teeth of the ratchet wheels 30 and cause semi-rotation to the spindle 15 and hence the sprocket and driving action to the rear or drive wheel 13 of the bicycle.

Springs not shown are suitably engaged with the levers 31 and convenient parts of the frame members to return the levers to their raised position.

Having thus described the invention and set forth the manner of its construction and application of the invention what is claimed as new and sought to secure by Letters Patent is:

In combination, a frame having a front steering wheel and a rear driving wheel mounted therein, said rear wheel having a shaft provided with a sprocket, a spindle mounted in said frame having a sprocket, a chain trained over said sprockets, a ratchet drive mechanism on the respective ends of said spindle operative in one direction and inoperative in a reverse direction, a toothed segment on each ratchet drive, a tension spring to return said segment to normal position, a bracket fixed to said frame adjacent said spindle, said bracket having substantially vertical guide ways on opposite sides, rack bars slidable in said guide ways, the teeth of said bars meshing with the teeth of said segments, and a foot pedal pivotally mounted on the upper ends of each rack bar.

JOSEPH KRAMPS.